US006779065B2

(12) United States Patent
Murty et al.

(10) Patent No.: US 6,779,065 B2
(45) Date of Patent: Aug. 17, 2004

(54) MECHANISM FOR INTERRUPT HANDLING IN COMPUTER SYSTEMS THAT SUPPORT CONCURRENT EXECUTION OF MULTIPLE THREADS

(75) Inventors: Keshav Murty, Phoenix, AZ (US); Scott Bobholz, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 480 days.

(21) Appl. No.: 09/945,419

(22) Filed: Aug. 31, 2001

(65) Prior Publication Data

US 2003/0046464 A1 Mar. 6, 2003

(51) Int. Cl.[7] ................................................ G06F 9/48
(52) U.S. Cl. ..................................................... 710/260
(58) Field of Search ............................. 710/260, 262, 710/263, 266, 268, 269

(56) References Cited

U.S. PATENT DOCUMENTS

| 5,109,522 A | * | 4/1992 | Lent et al. ................ 709/213 |
| 5,437,042 A | * | 7/1995 | Culley et al. ................ 710/28 |
| 5,915,088 A | * | 6/1999 | Basavaiah et al. ................ 1/1 |
| 6,061,710 A | * | 5/2000 | Eickemeyer et al. ........ 718/107 |
| 6,105,127 A | * | 8/2000 | Kimura et al. .............. 712/215 |
| 6,163,829 A | * | 12/2000 | Greim et al. ................ 710/260 |
| 6,205,468 B1 | * | 3/2001 | Diepstraten et al. ........ 718/108 |

OTHER PUBLICATIONS

M. Ben–Ari: "Principles of Concurrent and Distributed Programming", Prentice Hall, 1990 IP002221270, ISBN: 0–13–711821–X, p. 48; figure 4.1, p. 50, line 14–line 21.
Russel Rector–George Alexy: "Das 8086/8088 Buch—Programmieren in Assembler und Systemarchitektur" 1982, TE–WI, Munchen XP002221271, ISBN: 3–921–803–11–X, p. 8–32, line 15–line 17.
Bennet B: "Break the Performance Bottlenecks in Today's Multiprocessor Designs" EDN Electrical Design News, Massachusetts, US, vol. 39, No. 14, Jul. 7, 1994, pp. 113–114, 117–118, XP000469318, ISSN: 0012–7515, p. 113, right–hand column, line 10–page 114, left–hand column, line 22.

* cited by examiner

Primary Examiner—Glenn A. Auve
(74) Attorney, Agent, or Firm—Ami Patel Shah

(57) ABSTRACT

The present invention provides a mechanism for handling interrupts on a processor that supports multiple-threads concurrently. The processor's resources are allocated to provide multiple logical processors. In response to a common interrupt, the logical processors vie for access to a shared register. The first logical processor to access the shared register handles the common interrupt. The remaining logical processors return from the interrupt.

22 Claims, 4 Drawing Sheets

MECHANISM FOR INTERRUPT HANDLING IN COMPUTER SYSTEMS THAT SUPPORT CONCURRENT EXECUTION OF MULTIPLE THREADS

BACKGROUND OF THE INVENTION

1. Technical Field

The present invention relates to computer systems and, in particular to mechanisms for handling interrupts in computer systems that support concurrent execution of multiple threads.

2. Background Art

Modern high-performance processors are designed to execute multiple instructions on each clock cycle. To this end, they typically include extensive execution resources to facilitate parallel processing of the instructions. The efficient use of these resources may be limited by the availability of instructions that can be executed in parallel. The availability of instructions for parallel execution is referred to as instruction level parallelism (ILP). Instruction dependencies limit the ILP available in a single execution thread. If only one execution thread can be processed at a time, instruction throughput is reduced as well.

One approach to increasing instruction throughput is to design processors that are capable of executing instructions from two or more instructions threads concurrently. Since instructions from different threads are independent, concurrent execution of two or more instruction threads increases instruction throughput.

A variety of designs have been implemented to support concurrent execution of multiple threads in a single processor package. For example, multi-core processors include multiple execution cores on a single processor chip. Each execution core can be allocated to a different instruction thread, although various resources may be shared to save die area or to allow some communication among the executing threads. Multiple processor chips may also be incorporated in a multi-chip module that provides a single interface to the rest of the system.

Multi-threaded processors include resources to manage the execution of multiple instructions threads on a single execution core. Thread management units provide on-chip storage of state data for multiple threads and update the data as instructions from different threads are processed by the shared core.

A coarse-grained multi-threaded processor executes instructions from only one thread at a time, but on-chip storage of state data for multiple threads reduces the overhead associated with switching instruction execution between the different threads (context switches). Thread switching may be triggered when the currently executing thread encounters a long latency event (Switch-On-Event Multi-Threading or SOEMT).

A fine-grained multi-threaded processor allows instructions from the multiple threads to execute concurrently. For example, instructions may be issued from multiple threads on each clock cycle, or instructions may be issued from different threads on different clock cycles. In both cases, instructions from multiple threads may be in-flight in the execution core at the same time.

In general, both multi-threaded processors and multi-core processors allow more than one thread's context to be active in the processor at the same time. For multi-core processors, some or all of the cores maybe multi-threaded. Here, context refers to the registers that store a thread's architectural state for a particular processor architecture, and may include general, control and application registers. The performance benefits of these and other processors that support multiple thread contexts ("multiple-context processors") depend, in part, on the capacity of these processors to appear as multiple, equivalent logical processors. This equivalency greatly facilitates the balancing of workloads among the logical processors, and it simplifies management of the threads by the operating system. The goal, in effect, is to make a multiple-context processor appear as a symmetric multi-processor (SMP) system.

To increase symmetry among the multiple threads, certain resources are replicated for each logical processor of the multiple-context processor. For example, an interrupt unit is typically associated with each logical processor, to provide an interface between the logical processor and system level resources or shared resources of the multiple-context processor. The interrupt unit determines whether an interrupt is to be handled and provides a pointer to the interrupt handling code if the interrupt is accepted.

One disadvantage of providing an interrupt unit for each logical processor is that interrupts, particularly those associated with resources shared by the logical processors, are often seen by all logical processors. For example, a multiple-context processor may provide a single interrupt pin to maintain package-level compatibility with single-threaded designs. Interrupts asserted on the pin are seen by the interrupt units of all logical processors. A fan failure in the system may trigger such an interrupt. Because of their equivalence, each interrupt unit registers the interrupt and its associated logical processor executes the interrupt-handler. Interrupts generated by shared on-chip resources or received on system or dedicated interrupt buses may be seen and processed in a similar manner. In many cases, the interrupt could have been handled by one of the logical processors, but the symmetric configuration of the logical processors obliges each to execute the interrupt code.

The present invention addresses these and other issues associated with interrupt handling in processors that support concurrent execution of multiple threads.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DESCRIPTION OF THE INVENTION

The following discussion sets forth numerous specific details to provide a thorough understanding of the invention.

However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

Figure 1:
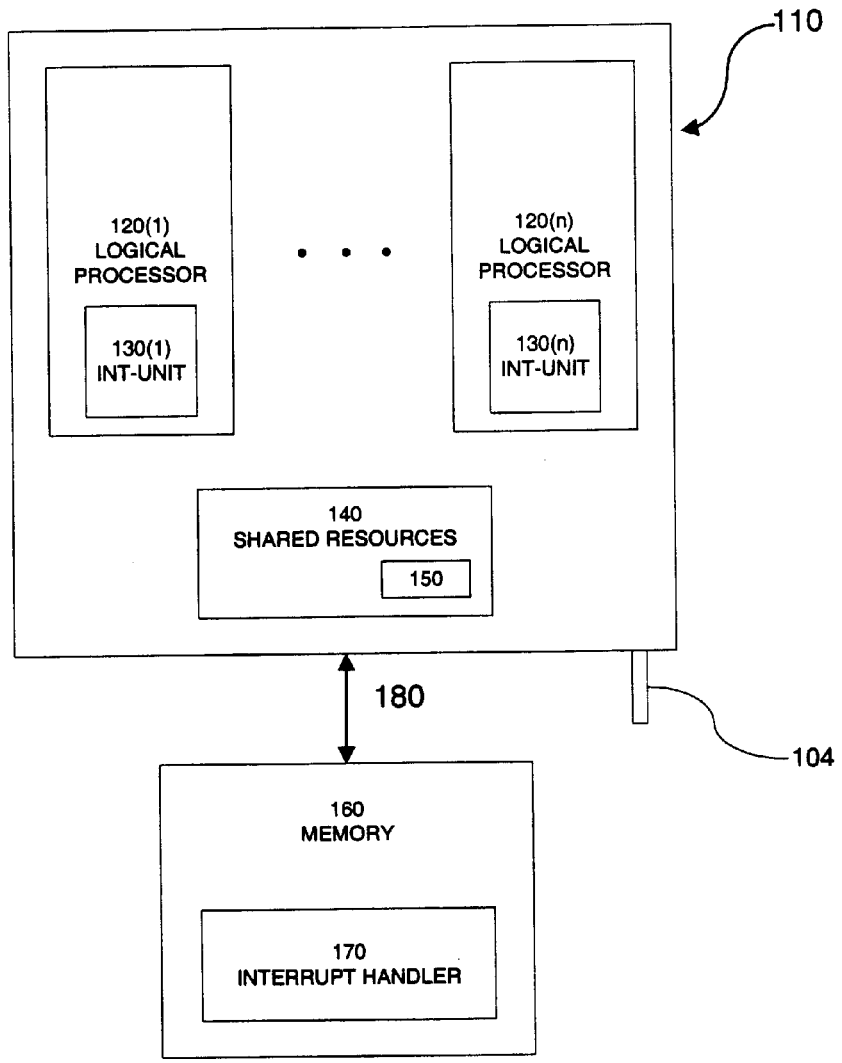
FIG. 1 is a block diagram of a computer system in which the present invention may be implemented.

FIG. 1 is a block diagram representing one embodiment of a computer system 100 in which the present invention may be implemented. Computer system 100 includes a multiple-context processor 110 to execute instructions stored in a memory 160. Data and instructions are coupled between processor 110 and memory 160 through a channel 180. Channel 180 may include one or more buses under control of a chipset or system logic (not shown).

For system 100, memory 160 stores an interrupt-handler 170 that is executed by resources on multiple-context processor 110, in response to an interrupt. Memory 160 may represent volatile memory structures, such as caches and main memory, as well as non-volatile memory structures, such as flash memory, hard and soft drives and the like. For one embodiment of the invention, a portion of interrupt-handler 170 may be implemented in firmware, while other portions may be stored in a main memory.

The logic of multiple-context processor 110 is represented as logical processors 120(1)–120(n) (generically, logical processor 120), including their associated interrupt units 130(1)–130(n), respectively (generically, interrupt unit 130), and shared resources 140. For example, each logical processor 120 may represent resources that are allocated to a particular thread, and shared resources 140 may represent those resources of processor 110 that are available to threads on all logical processors 120.

For the disclosed embodiment of system 100, shared resources 140 include an interrupt claim register (ICR) 150 that is accessible to each logical processor 120. As discussed in greater detail below, ICR 150 provides a mechanism through which one logical processor 120 signals the remaining logical processors that it will handle an interrupt. Shared resources 140 may also include a higher-level cache or bus logic used to communicate with memory 160 or peripheral devices (not shown).

Interrupt unit 130 represents a functional block associated with logical processor 120 to process interrupts. Certain interrupts may be handled by any of logical processors 120. For example, certain interrupts that originate in shared resources 140 on the processor and system or platform level interrupts that are generated by resources off the processor package typically may be handled by any logical processor 120. They may be communicated through an external pin 104 on the processor package, a bus, or through circuitry internal to processor 110. In the following discussion, interrupts such as these are referred to as common interrupts, to distinguish them from interrupts that are targeted to a specific logical processor.

Interrupt units 130(1)–130(n) register common interrupts for logical processors 120(1)–120(n), respectively. For example, each interrupt unit 130 assesses the priority assigned to an interrupt along with any masking conditions, to determine whether the interrupt merits immediate handling, e.g. whether the event that triggered the interrupt should take priority over the currently executing thread. If interrupt unit 130 determines that the interrupt has priority, it directs its associated logical processor 120 to an appropriate interrupt-handling routine. The present invention provides a mechanism that allows one logical processor 120 to execute the full interrupt-handling routine for an interrupt that is registered by all logical processors 120. It does so without imposing asymmetries on logical processors 120, such as arbitrarily assigning interrupts to logical processors 120.

For one embodiment of system 100, interrupt units 130(1)–130(n) register a common interrupt for logical processors 120(1)–120(n). If the interrupt has priority, interrupt units 130(1)–130(n) direct logical processors 120(1)–120(n), respectively, to interrupt-handler 170. Each of Logical processors 120(1)–120(n) executes a first code segment of interrupt-handler 170, which directs it to access ICR 150. The first of logical processors 120 that successfully accesses ICR 150 completes processing of the interrupt, and remaining logical processors 120 resume execution of their threads.

For one embodiment of the invention, ICR 150 is initialized to a first value and reset to the first value after a common interrupt. The initial code segment of interrupt-handler 160 directs each logical processor 120 to read the value currently in ICR 150 and to write a second value to ICR 150. Provided the second value differs from the first value, the first logical processor 120 to read ICR 150 sees the first value. All other logical processors 120 see the second value. The logical processor that reads the first value continues executing the interrupt-handler. The remaining logical processors read the second value, which signals them to return from the interrupt, e.g. to resume executing their interrupted threads.

Logical processors 120 do not necessarily respond to a common interrupt in lock step. The type of thread executing when the interrupt occurs, its priority or even the type of instructions currently in flight, may determine how quickly logical processor 120 accesses ICR 150. Depending on the embodiment, interrupt-handler 170 may be executable by only one processor at a time, in which case, the first logical processor to execute interrupt-handler 170 will be the first to access ICR 150.

Different embodiments of multiple-context processor 110 implement logical processors 120 in different ways. For a multi-core embodiment of multiple-context processor 110, each logical processor 120 corresponds to an execution core. A multi-core embodiment of multiple-context processor 110 is discussed in conjunction with FIG. 2. For a multi-threaded embodiment of multiple-context processor 110, each logical processor 120 corresponds to the resources of a single execution core that are allocated to a particular thread. A multi-threaded embodiment of multiple-context processor 110 is discussed in conjunction with FIG. 3. Other embodiments of multiple-context processor 110 may include, for example, multiple cores, some or all of which are multi-threaded. The present invention does not depend on the particular manner in which the logical processors are implemented in the processor.

Figure 2:
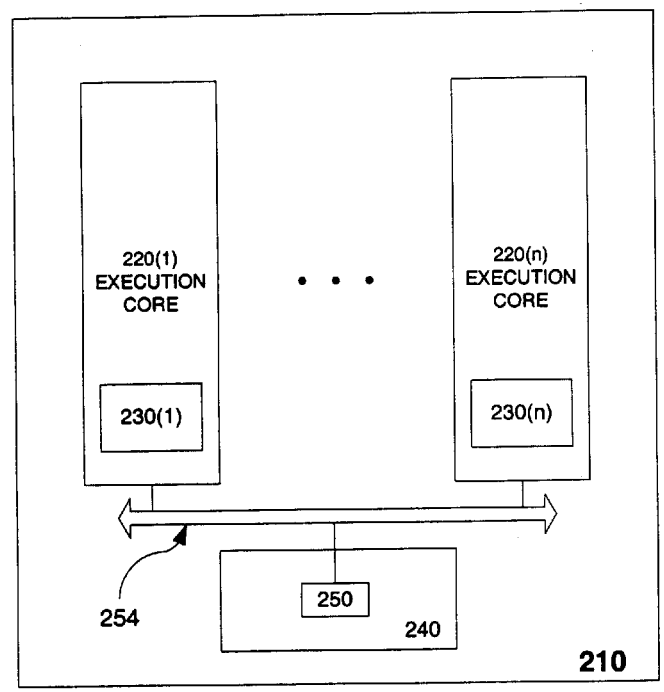
FIG. 2 is a block diagram of a multi-core processor in accordance with the present invention.

FIG. 2 is a block diagram representing a multi-core embodiment 210 of a multiple-context processor 110. Multi-core processor 210 provides execution cores 220(1)–220(n) and their corresponding interrupt units 230(1)–230(n), respectively, to support concurrent execution of up to n-threads. Also shown are shared resources 240, which include an interrupt claim register (ICR) 250. For the disclosed embodiment of multi-core processor 210, ICR 250 is accessed by execution cores 220(1)–220(n) through a bus 254.

In response to a common interrupt, each interrupt unit 230 determines whether the interrupt has priority and if so, it directs its corresponding execution core 220 to an interrupt-handler. Under control of a first portion of the interrupt-handler, execution cores 220 vie for access to ICR 250. The first to access ICR 250 completes the interrupt-handler. The remaining execution cores resume their interrupted threads. For another embodiment of multi-core processor 210, one or more of execution cores 220(1)–220(n) may also be multi-threaded, in which case, each thread on each core attempts to access ICR 250 first.

For one embodiment of the invention, the first code segment causes each logical processor 220 to read ICR 250. If logical processor 220 reads a first value in ICR 250, it proceeds to execute the remainder of the interrupt-handler. If logical processor 220 reads a second value in ICR 250, it may resume executing the instructions of the thread it was executing before the interrupt. To ensure that only one logical processor 220 reads the first value, the initial code segment may employ an atomic read-modify-write operation, such as a "test and set" operation. For example, if the first value in ICR 250 is zero, interrupt-handler 170 may read the value in ICR 250 and write a one to ICR 250 atomically. That is, the read-modify-write operations are executed without relinquishing ICR 250 to another logical processor. For this embodiment, only the first logical processor to reach ICR 250 reads the zero value. All other logical processors will read the one written to ICR 250 by the first logical processor that accessed ICR 250.

The embodiment described above is an example of a "race-to-flag" mechanism for determining which logical processor will handle a common interrupt. The flag may be contained in a register, a lock variable or similarly stored bit(s), which can be accessed by each logical processor. The read/write rules governing such a flag allow each logical processor, acting independently, to determine whether or not it is responsible for handling the common interrupt.

Figure 3:
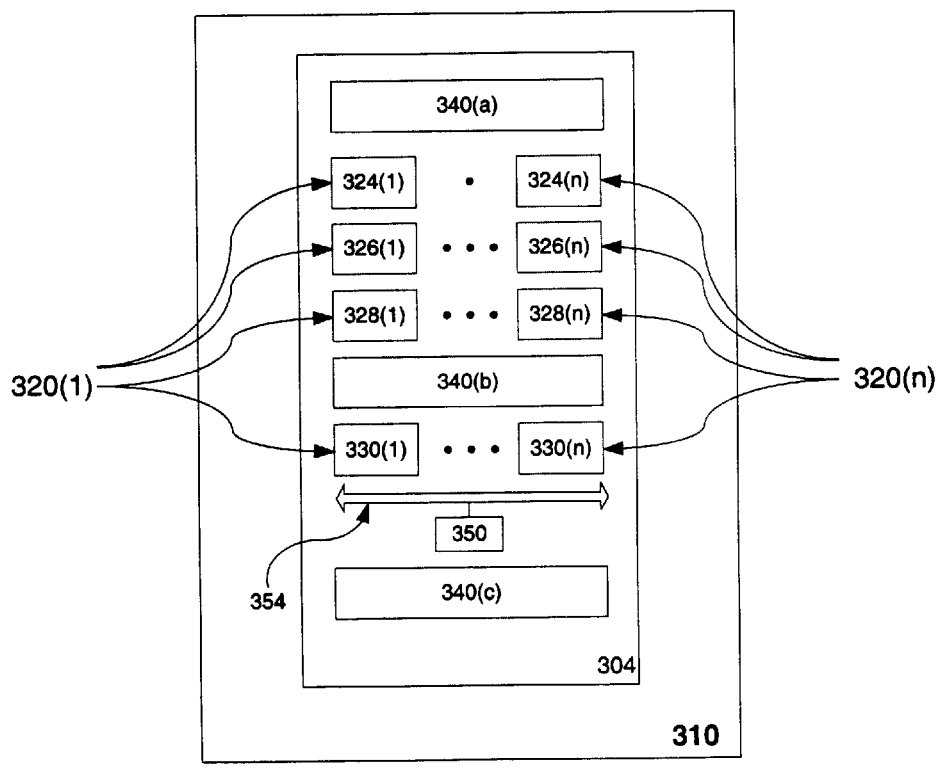
FIG. 3 is a block diagram a multi-threaded processor in accordance with the present invention.

FIG. 3 is a block diagram representing a multi-threaded embodiment 310 of multiple-context processor 110. Multi-threaded processor 310 includes an execution core 304 that allows concurrent processing of instructions from up to n-different threads. Execution core 304 is represented as a pipeline in which various stages are either allocated to one of the n-threads (blocks 324(1)–324(n), 326(1)–326(n), 328(1)–328(n), 330(1)–330(n)) or shared among the n-threads (blocks 340(a)–340(c) and ICR 350). For example, blocks 340(a), 340(b) and 340(c) may represent a shared instruction cache, a shared register rename unit, and a shared data cache. Blocks 324(1)–324(n), blocks 326(1)–326(n), blocks 328(1)–328(n) and blocks 330(1)–330(n) may represent portions of a fetch unit, a decode unit, an execution unit and an interrupt unit, respectively, that are allocated to threads 1-n. The resources allocated to a given logical processor are shown in vertical alignment solely to simplify FIG. 3. It is not intended to indicate any ordering of the resources allocated to a thread.

For the disclosed embodiment of processor 310, logical processor 320(1) is represented by allocated resources 324(1), 326(1), 328(1) and 330(1), and logical processor 320(n) is represented by allocated resources 324(n), 326(n), 328(n) and 330(n). This is done for purposes of illustration. Other representations may include portions of shared resources 340(a)–340(c) currently in use by the corresponding thread.

Interrupt units 330, like other allocated resources in processor 310, need not be physically distinct units. For example, they may represent portions of a single interrupt unit that is allocated to individual threads executing on processor 310. In response to a common interrupt, interrupt units 330(1)–330(n) register the interrupt and, determine whether it should be processed. If the interrupt has priority, interrupt units 330(1)–330(n) direct logical processors 320(1)–320(n) to execute an interrupt-handling routine, e.g. interrupt-handler 170. Each logic processor 320 executes a first code segment of the interrupt-handling routine, which causes it to access ICR 350. The first logic processor 320 to access ICR 350 executes the remainder of the interrupt-handling routine. The other logic processors 320 return to their interrupted threads.

The configurations of multi-core processor 210 and multi-threaded processor 310 are provided for purposes of illustration only. Other embodiments of multiple-context processors suitable for use with the present invention may employ different configurations. For example, the threads of a multi-threaded processor may share a front end and execution resources and only replicate register files. Persons skilled in the art of processor design and having the benefit of this disclosure will recognize other configurations of multiple-context processors that may be used in conjunction with the present invention.

Figure 4:
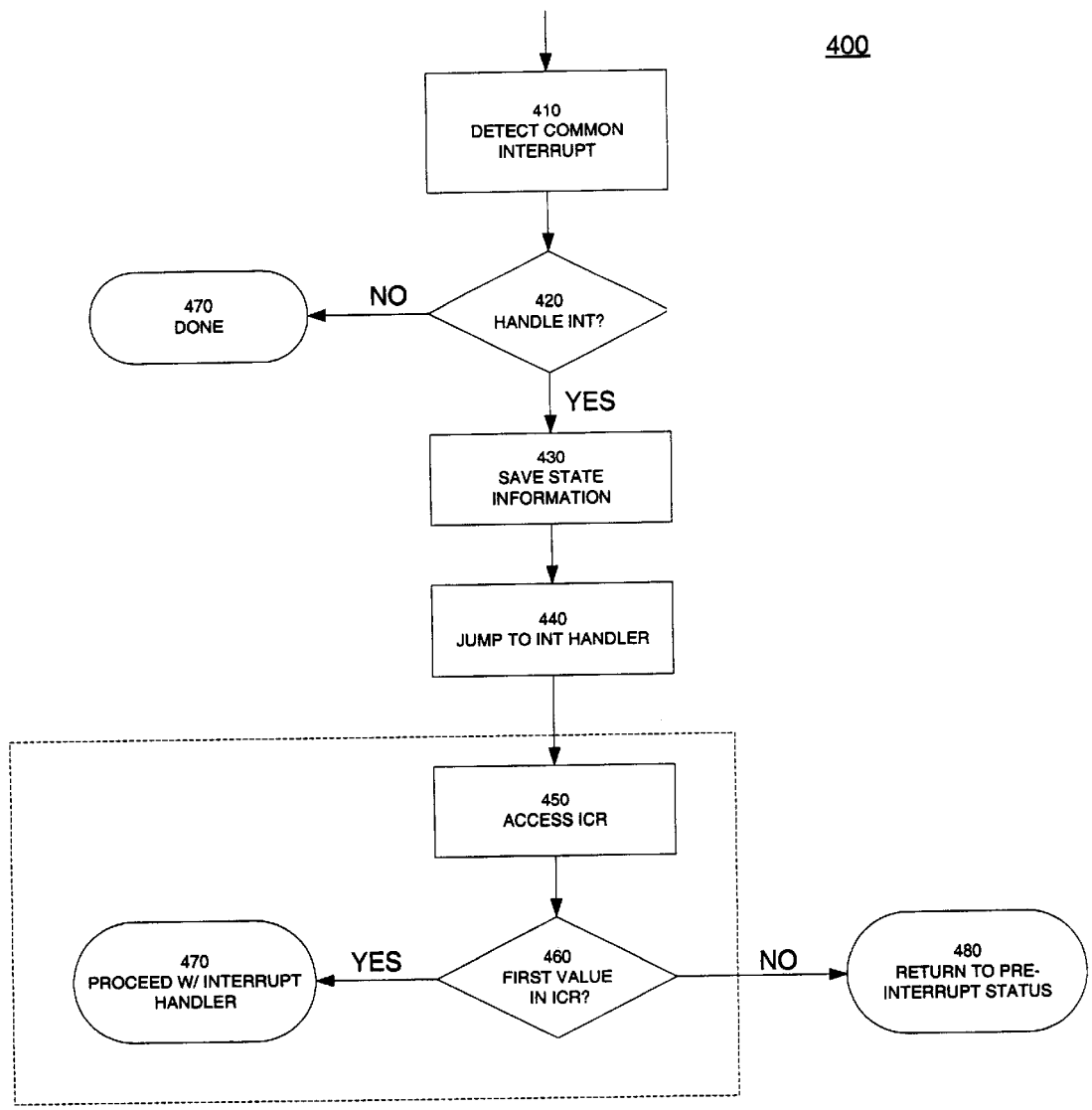
FIG. 4 is a flowchart representing one embodiment of a method for handling interrupts in accordance with the present invention.

FIG. 4 is a flow chart representing one embodiment of method 400 executed by each logical processor in a multiple-context processor, in response to a common interrupt. A common interrupt is detected 410, and the logical processor determines 420 whether the interrupt should be handled. For example, an interrupt unit of the logical processor may examine priority and masking bits to determine whether the detected interrupt takes precedence over the currently executing instruction thread. If the interrupt does not have priority, method 400 terminates 470. If the interrupt has priority 420, certain state information is saved 430 at an appropriate point in the currently executing thread, and the logical processor is directed 440 to the interrupt-handling routine at an indicated address. An interrupt unit typically provides the interrupt-handler address if it determines the interrupt has priority.

The state information saved prior to transferring control to an interrupt-handler is usually the smallest amount of state information that can return the logical processor to the interrupted instruction thread upon completion of the interrupt-handler. This reduces the overhead associated with executing the interrupt-handler.

On entering the interrupt-handling routine, the logical processor executes a first segment of code that directs it to access 450 an interrupt claim register (ICR) and compare 460 a value stored in the ICR with a first value. If the read value equals the first value, the logical processor proceeds 470 with the interrupt-handling routine. If the stored value does not equal the first value, the logical processor returns 480 from the interrupt.

To ensure that only one processor accesses the ICR at any time, embodiments of the present invention may protect the ICR or the code segment used to access the ICR. In the first case, the interrupt-handler may employ an atomic read-modify-write operation to modify the ICR. For this embodiment, if the logical processor reads a first value in the ICR it then writes a second value in the ICR without relinquishing control of the ICR between the read and write operations. Provided the ICR is reset to the first value between interrupts, the first logical processor to read the ICR will read the first value in the ICR and replace it with the second value. Any logical processor that reads the ICR after the first logical processor, responsive to the same interrupt, will read the second value and resume its pre-interruption activities.

For the second case, access to the first code segment of the interrupt-handler is gated by a critical-section bit. The first logical processor to reach the first code segment, performs an atomic read-modify-write of a critical-section bit, reading the value of the bit and writing a second value to the bit without relinquishing the bit between the read and write operations. If the read value indicates the first code segment is unlocked, the logical processor executes the code to read the value in the ICR. The second value written to the critical section bit ensures that no other logical processor can execute the first code segment in the meantime. If the read value indicates that the first code segment is locked the logical processor may return to the thread it had been executing. Since only one logical processor can execute the first code segment at a time, reading and writing of the ICR does not require an atomic operation. Persons skilled in the art and having the benefit of this disclosure will recognize various other mechanisms for ensuring that only one logical processor claims ownership of the common interrupt.

Once the flag (ICR, lock variable, etc.) has been accessed by all the logical processors in response to a common interrupt, the flag should be reset to the first value for the next common interrupt. For one embodiment of the invention, the last logical processor to read the flag in response to a common interrupt, resets it to the first value. For example, the flag may be defined to include a bit for each logical processor supported by the multiple-context processor. As each logical processor accesses the flag it sets the corresponding flag bit. The last logical processor sets its corresponding flag bit, and it resets all the bits in the flag to the first value.

For another embodiment, the initial code segment of the interrupt handler may instruct a logical processor to increment a count value (i.e. flag) and read the incremented count value. If the incremented count value equals the number of logical processors currently active on the processor, the logical processor resets the count value to the first value. If the incremented count value is less than the number of logical processors that are currently active, the logical processor returns from the interrupt.

These mechanisms for resetting the flag assume that the time between common interrupts is typically greater than the time necessary for all of the logical processors to execute the interrupt handler (or portions thereof) and access the flag. Persons skilled in the art of processor design and having the benefit of this disclosure will recognize other mechanisms for resetting the flag once ownership of a common interrupt has been determined.

Figure 5:
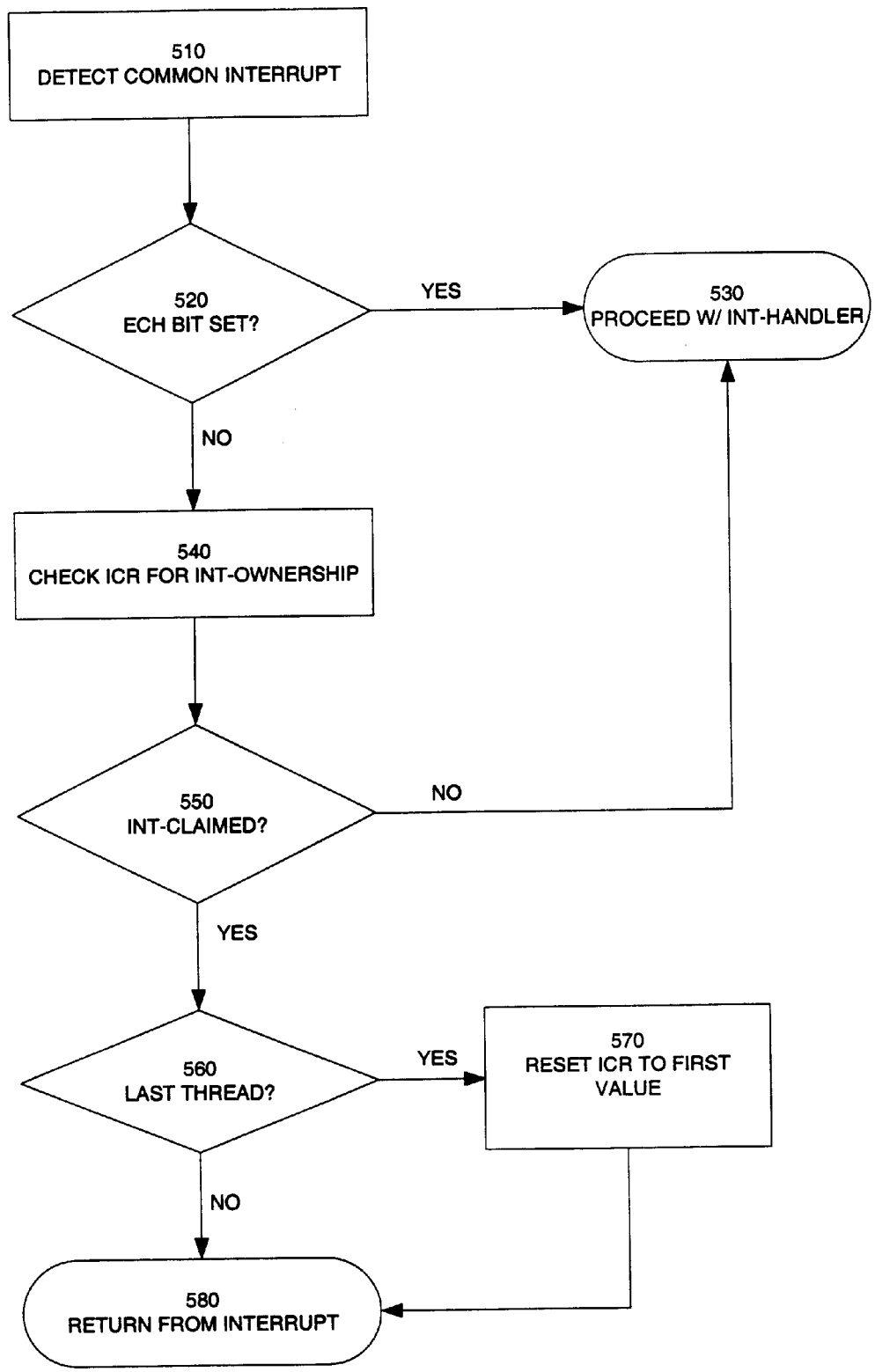
FIG. 5 is a flowchart representing another embodiment of a method for handling interrupts in accordance with the present invention.

FIG. 5 is a flowchart representing one embodiment of a method 500 in accordance with the present invention for handling interrupts. Method 500 allows duplicate handling of common interrupts to be enabled or disabled. For example, it may be necessary to have all logical processors respond to a common interrupt, such as a machine check or a thermal event. For these and other common interrupts that require all logical processors to respond, duplicate handling of interrupts may be enabled through reference to bit ECH (enable common handling). This bit may be set for selected common interrupts when the system is first booted or changed later to customize a particular system environment.

Method 500 is initiated 510 in response to detection of a common interrupt. A logical processor checks 520 a bit to determine whether duplicate interrupt handling is enabled. If it is enabled, the logical processor proceeds 530 with the interrupt-handler, regardless of what other logical processors are doing. If the bit indicates 520 that duplicate interrupt handling is disabled, the logical processor checks 540 the ICR to determine whether ownership of the interrupt has been claimed. If the interrupt has not been claimed 550, the logical processor proceeds 530 with the interrupt-handler. Mechanisms discussed above for controlling access to the ICR are applicable to method 500. If the interrupt has been claimed 550, the logical processor determines 560 if it is the last thread to respond to the common interrupt. If it is, the logical processor resets 570 the ICR to the first value and returns 580 from the interrupt-handler to resume execution of the thread it had been handling when the interrupt occurred. If it is not the last thread to respond to the common interrupt, it returns 580 from the interrupt handler without resetting the ICR. Method 400 mechanisms discussed above for determining if the logical processor is the last thread to respond to the common interrupt and reset the ICR (i.e. flag) accordingly are applicable to method 500.

There has thus been disclosed a mechanism for handling certain interrupts in computer systems that include multiple-context processors. The logical processors on a multiple-context processor vie for access to a shared register, responsive to a common interrupt. The first of the logical processors to access the shared register handles the interrupt. The remaining logical processors detect that the interrupt has been claimed and return from the interrupt-handler. For one embodiment of the invention, the interrupt-handler includes a first code section that is executed by all logical processors on the package, responsive to the common interrupt. The shared register is initialized to a first value, and the first code section directs each logical processor to read the shared register. The first logical processor to access the shared register following a common interrupt reads the first value, writes a second value, and continues executing the interrupt-handler. The remaining logical processors read the second value, which directs them to exit the interrupt-handler.

For another embodiment of the invention, an enable/disable bit is provided to signal whether or not common interrupts will be processed redundantly. If the bit is the disable state, the interrupt is claimed by the first logical processor to access the shared register by executing a first segment of an interrupt-handling routine. If the bit is in the enable state, the first code segment is bypassed, and all logical processors execute the interrupt-handler routine to completion.

The disclosed embodiments have been provided to illustrate various features of the present invention. The present invention may find use in computers and other processor-based systems which employ multiple-context processors. Persons skilled in the art and having the benefit of this disclosure will recognize variations and modifications of the disclosed embodiments, which none the less fall within the spirit and scope of the appended claims.

We claim:

1. A processor comprising: a first interrupt unit to direct a first logical processor to an interrupt-handler, in response to an interrupt; a second interrupt unit to direct a second logical processor to the interrupt-handler, in response to the interrupt; and an interrupt claim register to store a value that indicates if one of the first and second logical processors is to handle the interrupt.

2. The processor of claim 1, wherein the first and second logical processors read a value in the interrupt claim register under control of the interrupt-handler.

3. The processor of claim 2, wherein the first logical processor handles the interrupt if it reads the interrupt claim register first.

4. The processor of claim 3, wherein the second logical processor exits the interrupt-handler if the first logical processor handles the interrupt.

5. The processor of claim 4, wherein the second logical processor determines that the first logical processor handles the interrupt by reading a value in the interrupt claim register that is written by the first logical processor.

6. A system comprising: a processor including an interrupt claim register and a plurality of thread resources to process instructions for a corresponding plurality of instruction threads, respectively; and a memory to store an interrupt-handler including instructions that are executable by each of the plurality of thread resources, responsive to an interrupt, to: read a value in the interrupt claim register; and process the interrupt or resume instruction execution responsive to the read value.

7. The system of claim 6, wherein the plurality of thread resources comprises a plurality of execution cores of the processor.

8. The system of claim 6, wherein the plurality of thread resources comprise a plurality of resources of an execution core that are allocated to a plurality of instruction threads.

9. The system of claim 6, wherein the interrupt-handler includes instructions that are further executable by each of the thread resources to write a second value to the interrupt claim register after reading the value in the interrupt claim register.

10. The system of claim 9, wherein the interrupt claim register is initialized to store a first value and the first of the thread resources to read the first value replaces it with a second value and handles the interrupt.

11. The system of claim 10, wherein a remainder of the plurality of thread resources execute a return from the interrupt responsive to reading the second value in the interrupt claim register.

12. A system comprising: a memory in which is stored an interrupt-handler; and a processor including an interrupt claim register and execution resources to support a plurality of logical processors, each of the logical processors to vie for access to the interrupt claim register, using the interrupt-handler, responsive to an interrupt signal.

13. The system of claim device of claim 12, wherein the execution resources to support a plurality of logical processors includes a plurality of execution cores.

14. The system of claim 13, wherein each execution core includes an interrupt unit to direct control of the execution core to the interrupt-handler, responsive to the interrupt signal.

15. The system of claim 13, wherein each of the execution cores processes instructions of the interrupt-handler to read the interrupt claim register and to continue executing the interrupt-handler or return from the interrupt-handler responsive to value read in the interrupt claim register.

16. The system of claim 15, wherein a first of the execution cores to read the interrupt claim register, responsive to the interrupt signal, completes execution of the interrupt-handler and other of the execution cores exit the interrupt-handler.

17. The system of claim 12, wherein a first of the logical processors to access the interrupt claim register completes execution of the interrupt-handler.

18. The system of claim 17, wherein the logical processors that access the interrupt claim register after the first logical processor, exit the interrupt-handler.

19. The system of claim 12, wherein the execution resources to support a plurality of logical processors include a plurality of execution cores, at least one of which supports multi-threading.

20. A method implemented by each thread currently executing on a multiple-context processor, responsive to an interrupt, the method comprising: accessing an interrupt-handler at an indicated memory location; executing the interrupt-handler to read a value in an interrupt claim register; and completing execution of the interrupt-handler if the value read from the interrupt claim register is a first value.

21. The method of claim 20, wherein executing the interrupt-handler comprises reading the value in the interrupt claim register and writing a second value to the register without relinquishing control of the register.

22. The method of claim 20, further comprising terminating execution of the interrupt-handler if the value read from the interrupt claim register is a second value.

* * * * *